(12) United States Patent
Parrott et al.

(10) Patent No.: US 7,971,942 B2
(45) Date of Patent: Jul. 5, 2011

(54) TRAILER BRAKE SYSTEM

(75) Inventors: Thomas Parrott, Clarkston, MI (US); Axel Stender, Hameln (DE); Ingo Tha, Hannover (DE)

(73) Assignee: WABCO GmbH, Hannover (DE)

( * ) Notice: Subject to any disclaimer, the term of this patent is extended or adjusted under 35 U.S.C. 154(b) by 913 days.

(21) Appl. No.: 11/524,049

(22) Filed: Sep. 19, 2006

(65) Prior Publication Data

US 2008/0067862 A1 Mar. 20, 2008

(51) Int. Cl.
*B60T 7/20* (2006.01)
(52) U.S. Cl. .................... 303/123; 303/7; 303/118.1
(58) Field of Classification Search ............ 303/123, 303/7, 9.66, 9.74, 128, 133, 135, 118.1
See application file for complete search history.

(56) References Cited

U.S. PATENT DOCUMENTS

| | | | | |
|---|---|---|---|---|
| 4,568,129 | A * | 2/1986 | Stumpe | 303/7 |
| 6,062,653 | A * | 5/2000 | Daugherty et al. | 303/7 |
| 6,758,536 | B2 * | 7/2004 | Jacob | 303/7 |
| 6,970,772 | B2 * | 11/2005 | Radtke et al. | 701/1 |
| 2003/0195668 | A1 * | 10/2003 | Radtke et al. | 701/1 |

FOREIGN PATENT DOCUMENTS

| | | |
|---|---|---|
| EP | 1 188 634 B1 | 3/2002 |
| GB | 2402983 A * | 12/2004 |

* cited by examiner

*Primary Examiner* — Xuan Lan Nguyen

(74) *Attorney, Agent, or Firm* — Kramer Levin Naftalis & Frankel LLP

(57) ABSTRACT

A trailer brake system constructed and arranged to effect the relay of a brake signal from the tractor and an automatically generated brake signal of an electronic control device of the trailer to one or more additional trailers in an expanded vehicle train. In one embodiment, the brake signal is relayed to an additional coupled trailer in the form of an electrical signal via an electrical interface. In another embodiment, the brake signal is relayed to an additional trailer by means of a valve device. In yet another embodiment, the brake signal is relayed to an additional trailer by means of a combination of electrical signal transmission and valve device.

11 Claims, 4 Drawing Sheets

TRAILER BRAKE SYSTEM

BACKGROUND OF THE INVENTION

The present invention relates generally to an improved trailer brake system for an expanded vehicle train including a tractor and multiple trailers, such as, for example, semitrailers or drawbar trailers, coupled in series thereto.

A brake system of the general type under consideration is described in EP 1188634 A2. In the conventional brake system described in EP 1188634 A2, an electronic control device is provided that is capable of, among other things, preventing wheel lock or apportioning braking force as a function of axle load.

Also, the electronic control device can generate an automatic brake signal, even without brake actuation by the vehicle train operator, to brake individual vehicle wheels or all wheels to effect handling stability control or prevent rollover of the vehicle train about its longitudinal axis.

Furthermore, for braking an additional trailer coupled to the first or preceding trailer to form an expanded vehicle train, brake pressure generated on the basis of brake actuation by the vehicle operator is typically relayed via the first trailer to the brake system of the attached additional trailer.

If, however, the first trailer is equipped with a brake system having a conventional electronic control device of the type described above, an automatic brake signal from the electronic control device has no braking effect on the additional trailer. Consequently, the electronic control function corresponding to the automatic brake signal, an example being a vehicle rollover prevention function, cannot be completely effective. Also, with the automatic braking of the first trailer, the handling stability behavior of the vehicle train can change in an undesired way if the additional trailer pushes on the first or preceding trailer.

SUMMARY OF THE INVENTION

Generally speaking, it is an object of the present invention to provide a trailer brake system that overcomes the disadvantages of conventional systems and that permits safe handling of an expanded vehicle train and efficient use of the brake systems of all coupled trailers.

As a preliminary matter, it should be understood that the term "brake signal" as used herein can include both an electrical signal, which can be formed, for example, as a digital data signal, or a pressure (i.e., brake pressure) signal.

The present invention, described in greater detail hereinafter, provides, in a simple and cost-effective manner, the capability to coordinate the relay to one or more additional trailers in an expanded vehicle train of (i) a brake signal from the tractor, initiated either by the vehicle operator or automatically by an electronic system in the tractor, and (ii) an automatically generated brake signal of the electronic control device of the trailer brake system.

In accordance with a first embodiment of the present invention, relaying of the automatic brake signal to an additional coupled trailer is provided in the form of transmission of electrical signals, for example over a data bus. This embodiment is particularly cost-effective, since it does not require any particularly complex hardware.

In accordance with a second embodiment of the present invention, the brake signal can be relayed to an additional trailer by means of a valve device. This has the advantage that a trailer having a brake system that can be actuated exclusively by pneumatic control (that is, no electrical interface is present to receive the brake signal as an electrical signal) can be coupled as an additional trailer. Thus, the second embodiment offers diversity and flexibility in use.

A combination of the first and second embodiments is also advantageous. Such a combination enables use independent of the nature of the brake system of the additional trailer(s).

Still other objects and advantages of the present invention will in part be obvious and will in part be apparent from the specification.

The present invention accordingly comprises the features of construction, combination of elements, and arrangements of parts which will be exemplified in the constructions hereinafter set forth, and the scope of the invention will be indicated in the claims.

BRIEF DESCRIPTION OF THE DRAWINGS

For a fuller understanding of the present invention, reference is had to the following description taken in connection with the accompanying drawings in which.

DETAILED DESCRIPTION OF THE PREFERRED EMBODIMENTS

Figure 1:
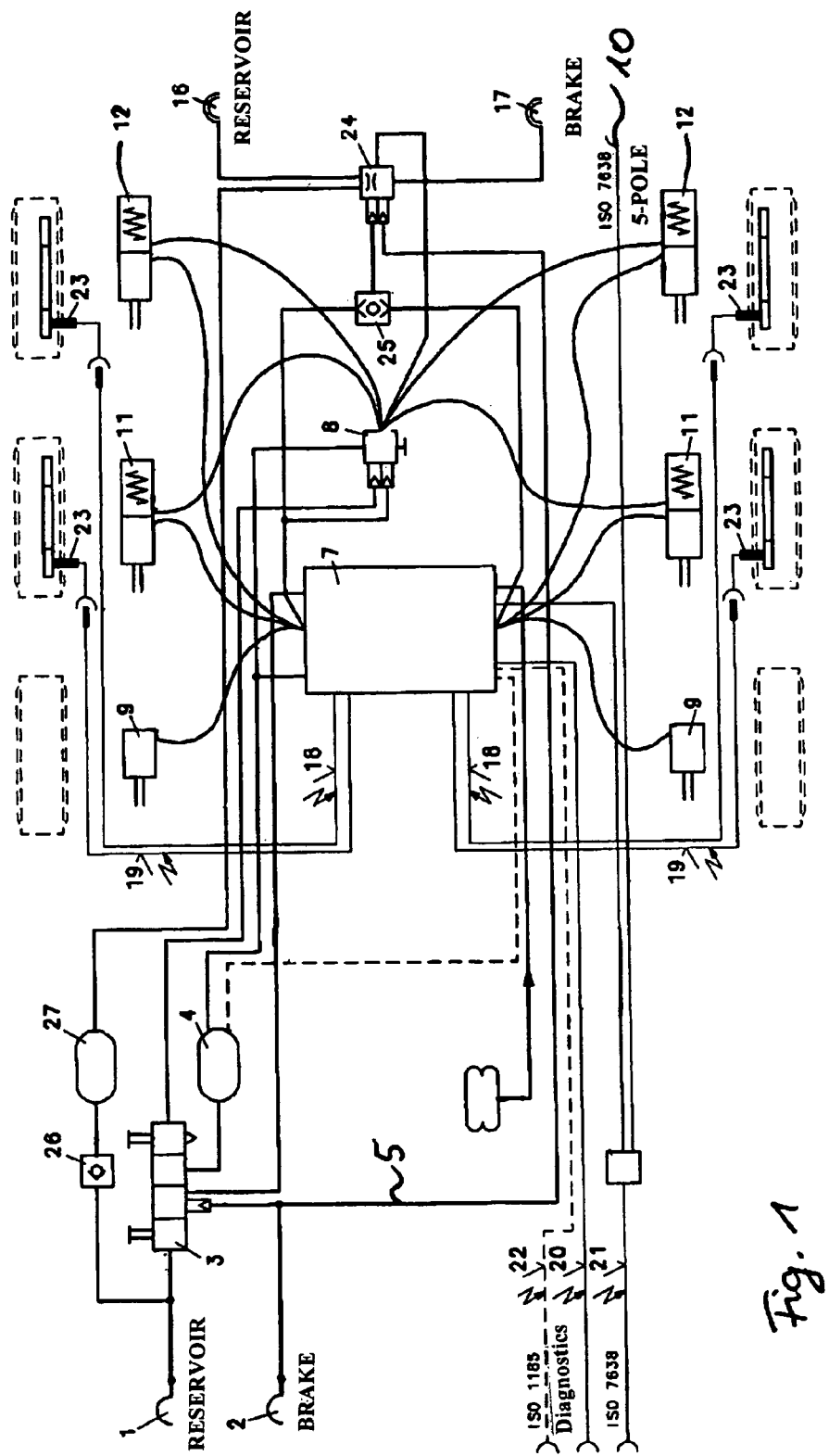
FIGS. 1 to 4 are schematic diagrams depicting embodiments of a trailer brake system according to the present invention.

Referring to the drawing figures, where like reference numerals are used for corresponding parts, the trailer brake system in accordance with an embodiment of the present invention depicted in FIG. 1 is provided with a reservoir coupling head 1 and a brake coupling head 2. Coupling heads 1, 2 are used for connection to corresponding pressurized fluid ports of the vehicle tractor.

Via reservoir coupling head 1, a reservoir pressure of the tractor is injected into the brake system of the trailer. This reservoir pressure is guided via a check valve 26 to a compressed air reservoir tank 27 of the trailer.

The pressure of reservoir coupling head 1 is further guided to a combined park/release safety valve 3. The park/release safety valve 3 is used for manual control of the vehicle parking brake function or for releasing the parking brake in emergencies. Valve 3 is further used as a trailer brake valve with break safeguard, meaning that automatic braking of the trailer is initiated in the event of a defect in or a break in the pneumatic lines by which the trailer is in communication with the tractor.

The brake signal is fed via brake coupling head 2 as a brake pressure signal from the tractor to the brake system of the trailer. The brake signal of the tractor is influenced, for example, by brake actuation by the vehicle train operator. In the presence of an electronically controlled brake system in the tractor, the brake signal from the tractor is also influenced by electronic control functions, such as the vehicle electronic stability control function (ESC) or the braking force distribution function.

The brake system according to the embodiment of the present invention depicted in FIG. 1 also contains electrical terminals 20, 21, 22 that can handle electrical brake signals from the tractor (e.g., a tractor having an electronically controlled brake system).

The brake system depicted in FIG. 1 is also provided with an electronic control device 7, which is connected to the electrical signals fed via terminals 20, 21, 22. The electronic control device, which is advantageously designed as a mechatronic device, is provided with an integrated valve part to which park/release safety valve 3, a further reservoir tank 4 and brake cylinders 9, 11, 12 are connected. Furthermore, control device 7 is connected via electrical lines 18, 19 to speed of rotation sensors 23, via which the speeds of rotation of wheels of the trailer are measured.

Brake cylinders 11, 12 equipped with a spring actuator are also connected pneumatically via an overload protection valve 8 to control device 7 and to reservoir tank 27.

In vehicle trains expanded through the addition of a further trailer (e.g., to expand cargo capacity), the pressure signals from the first trailer are relayed to the additional trailer—that is, the reservoir coupling head of the added trailer is connected to reservoir tank 27 of the first trailer and the brake coupling head of the added trailer is connected to pneumatic line 5 in communication with brake coupling head 2 of the first trailer. Also, the electrical signals are typically relayed to the added trailer via a plug connection 10.

Besides performing other control functions, electronic control device 7 effects automatic braking of the trailer upon recognition of a critical driving condition, such as, for example, a potential rollover of the trailer about its longitudinal axis (rollover risk can be reduced by reducing vehicle speed). In the case of a critical driving condition, electronic control device 7 automatically generates a brake signal by injecting brake pressure into brake cylinders 9, 11, 12.

A two-way valve 25 is provided in the brake system according to the embodiment of the present invention depicted in FIG. 1 for relaying automatic brake signals of electronic control device 7. Two-way valve 25 is designed as a type of double check valve, to the effect that it delivers the higher of two input pressures at its output.

According to FIG. 1, the brake pressure signal of the wheel brake of one wheel of the right side of the vehicle and the brake pressure signal of the wheel brake of one wheel of the left side of the vehicle are connected to the two inputs of two-way valve 25. Preferably, the wheels of the primary axle of the trailer are used for this purpose.

At its output, two-way valve 25 delivers the higher of the two brake pressures to a trailer control valve 24. Trailer control valve 24 corresponds, for example, to commercial trailer control valves, as are also used in tractor vehicles for control of the brake systems of trailers. Accordingly, trailer control valve 24 is in communication with reservoir tank 27 and, at its reservoir output, delivers a reservoir pressure signal for the additional trailer to a reservoir coupling port 16. Furthermore, the trailer control valve is in communication with overload protection valve 8 and with brake coupling head 2. At a further output, trailer control valve 24 delivers, to a brake coupling port 17, the respective higher value of the brake pressure value received from the tractor via brake coupling head 2 and the brake pressure value received from two-way valve 25.

The added trailer can be coupled analogously via two pneumatic lines to coupling ports 16, 17 and via an electrical line to terminal 10. As a result, the brake system of the added trailer can behave the same way as the brake system of the first trailer with respect to braking initiated by both the vehicle train operator and by automatic brake signals. It should be appreciated that designing the brake system of the added trailer in the same way permits expansion of the vehicle train with additional trailers.

The brake system according to the embodiment of the present invention depicted in FIG. 2 corresponds to the brake system described herein on the basis of FIG. 1, except for the differences discussed hereinafter.

Figure 2:
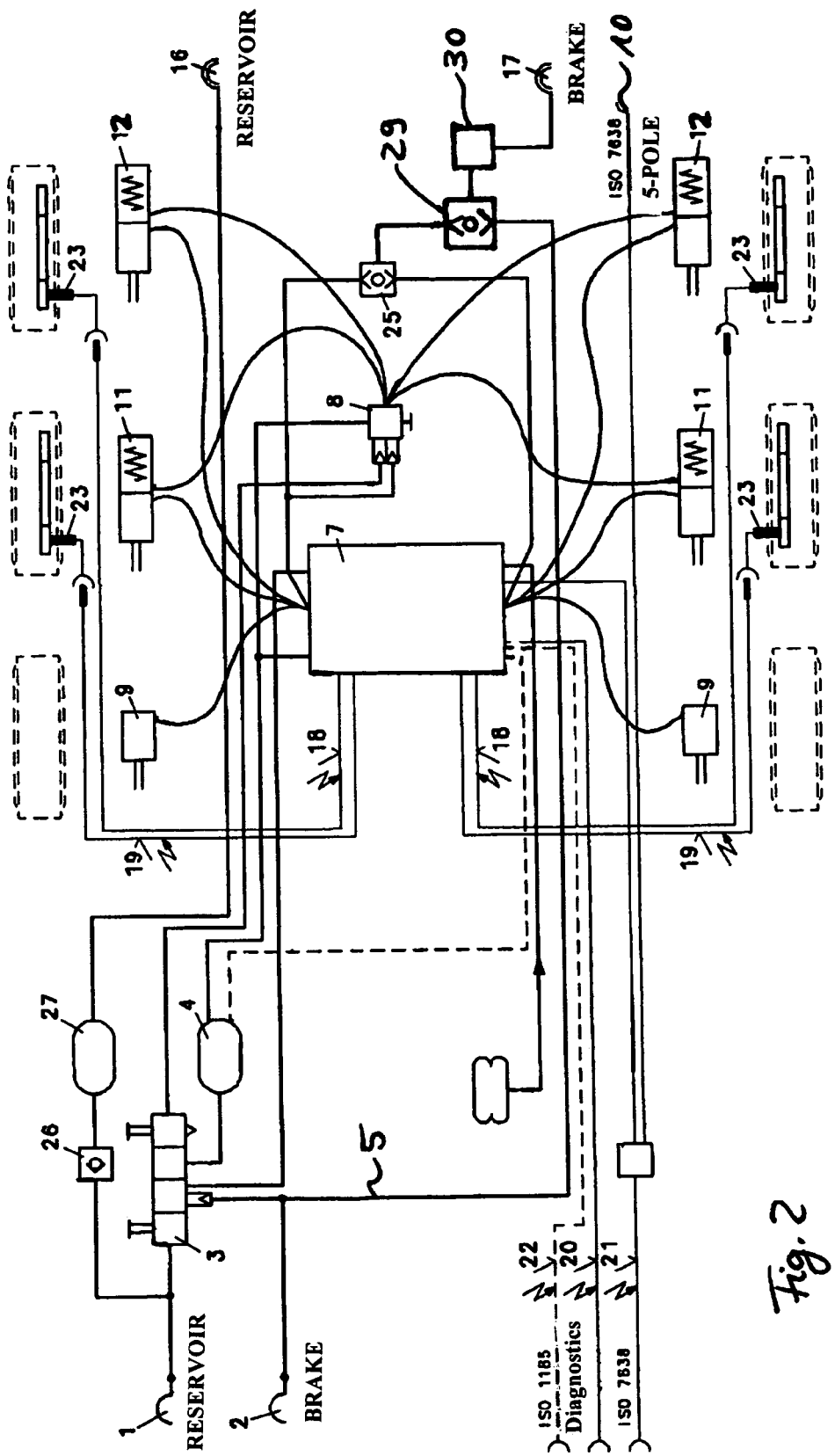

According to FIG. 2, a second two-way valve 29 is connected via a first input to the output side of two-way valve 25. The second input of second two-way valve 29 is in communication with brake coupling head 2. On the output side, second two-way valve 29 delivers the higher of the two pressures present at its input ports to its output, just as in the embodiment depicted in FIG. 1. The use of second two-way valve 29, however, permits a more cost-effective implementation of the brake system than if trailer control valve 24 were used.

According to one advantageous configuration, a quick-release valve 30 is provided on the output side of second two-way valve 29. Quick-release valve 30 permits faster depressurization in the downstream pressure line of the additional trailer in communication with brake coupling port 17 if the brakes are to be released.

The embodiment of the inventive brake system depicted in FIG. 3 corresponds to the brake system described herein on the basis of FIG. 2, except for the differences discussed hereinafter.

Figure 3:
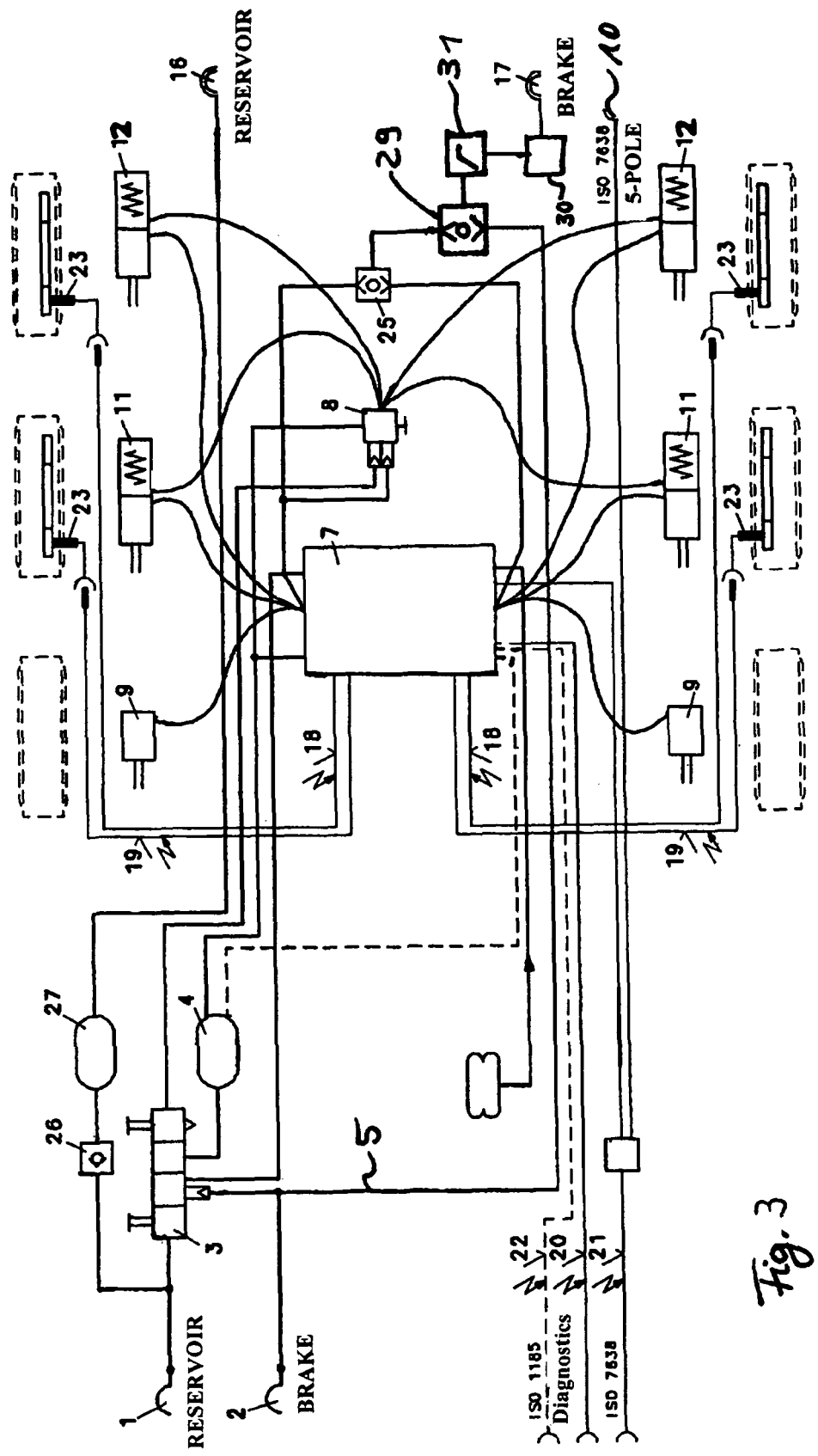

According to FIG. 3, an additional pressure-limiting valve 31 is provided between second two-way valve 29 and quick-release valve 30. By this configuration, the danger of wheel lock of the further trailer can be reduced, especially in the use of an additional trailer that is not equipped with a braking system with anti-lock functionality. Pressure-limiting valve 31 can also be integrated structurally into second two-way valve 29 or quick-release valve 30.

The embodiment of the inventive brake system depicted in FIG. 4 corresponds to the brake system described herein on the basis of FIG. 2, except for the differences discussed hereinafter.

Figure 4:
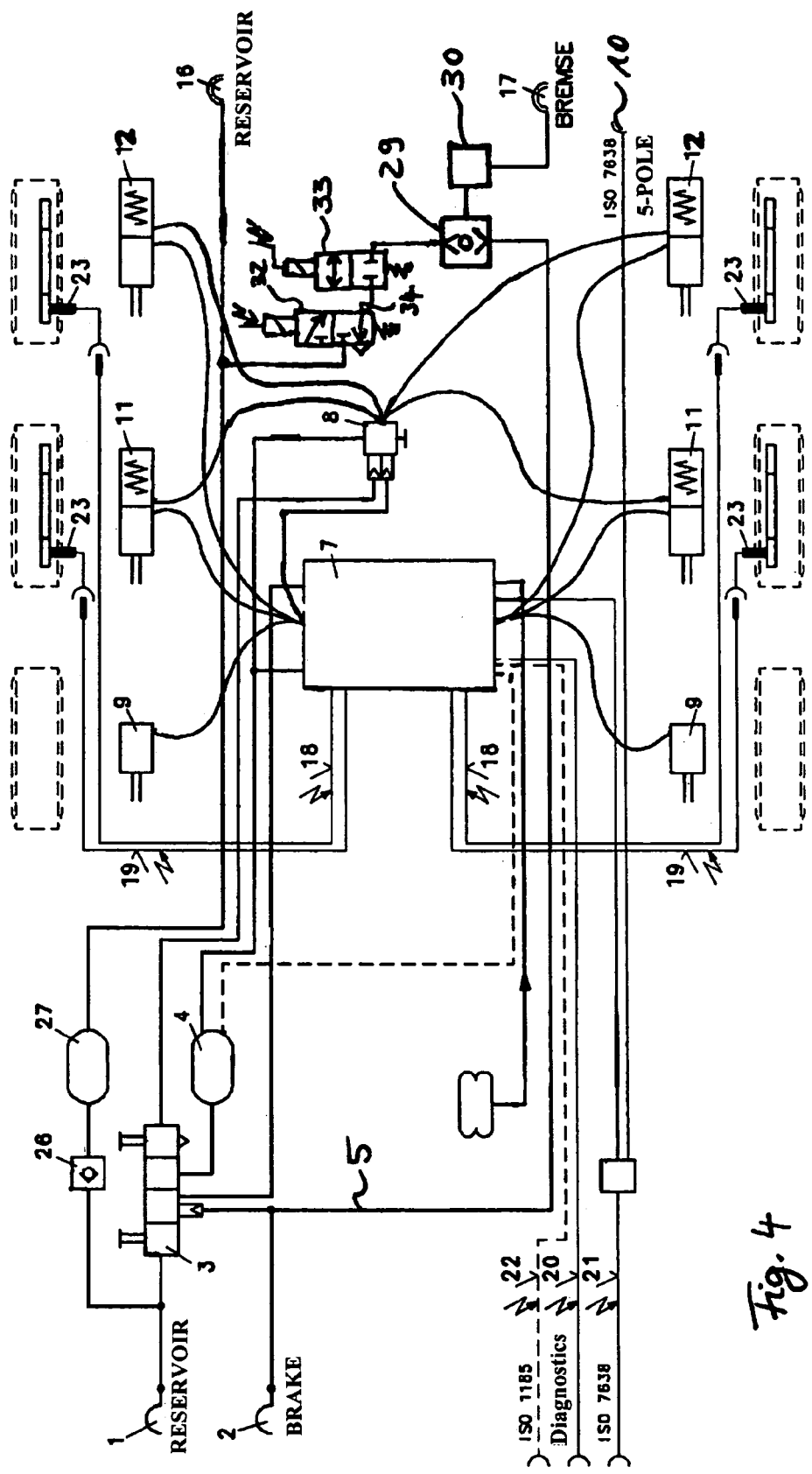

According to FIG. 4, the brake signal relayed to the added trailer is generated by a valve device 32, 33 activated by electronic control device 7 by means of an electrical signal. For this purpose, electronic control device 7 is connected via electrical lines to valve device 32, 33.

In the embodiment depicted in FIG. 4, valve device 32, 33 comprises two solenoid valves. Solenoid valve 32 is designed as a 3/2-way valve. In its operating position illustrated in FIG. 4, a port 34 in communication with solenoid valve 33 is in communication with atmosphere. Thus, port 34 is being vented. In a second operating position, port 34 is in communication with reservoir tank 27. Solenoid valve 33 is designed as a 2/2-way valve. It has a shutoff position and a passing position. Solenoid valve 33 is in communication with two-way valve 29. Via valve device 32, 33, and by appropriate magnet activation, the pressure signal delivered to two-way valve 29 can be optionally increased, decreased or held at a current value.

While the embodiment of the present invention depicted in FIG. 4 employs valve device 32, 33, it should be appreciated that alternatives thereto that permit optional adjustment of the pressure signal delivered to two-way valve 29, such as, for example, a proportional valve, can be used.

Accordingly, the present invention achieves an improved trailer brake system for an expanded vehicle train that coordinates the relay to one or more additional trailers of a brake signal from the tractor and an automatically generated brake signal of the electronic control device of the trailer brake system. The present invention is particularly advantageous in that it can be implemented in a simple and cost-effective manner.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A brake system of a trailer vehicle that can be coupled to a tractor vehicle to form a vehicle train, the brake system of the trailer vehicle comprising:
    an electronic control device,
    brakes actuatable based on a first brake signal received from the tractor vehicle and a second brake signal generated automatically by the electronic control device, and
    a valve device operable to receive the first brake signal, the electronic control device operable to relay the second brake signal to at least one additional trailer coupled to the vehicle train to effect braking of said at least one additional trailer.

2. The brake system according to claim 1, wherein the second brake signal is generated by the electronic control device based at least in part on at least one of a vehicle stability control function and a vehicle rollover prevention function.

3. The brake system according to claim 1, wherein at least one of the first and second brake signals is relayed to the at least one additional trailer via an electrical interface.

4. The brake system according to claim 1, wherein the valve device is further operable to receive the second brake signal relayed by the electronic control device, and wherein at least one of the first and second brake signals is relayed to the at least one additional trailer via the valve device.

5. The brake system according to claim 4, wherein the valve device is operable to relay the greater brake demand represented by one of the first and second brake signals to the at least one additional trailer.

6. The brake system according to claim 1, wherein the valve device includes a trailer control valve.

7. The brake system according to claim 1, wherein the greater of two brake pressures each associated with a different side of the trailer is a measure for the second brake signal to be relayed to the at least one additional trailer.

8. The brake system according to claim 1, wherein the second brake signal is injected at a brake coupling head of the at least one additional trailer.

9. The brake system according to claim 1, wherein the second brake signal is relayed by another valve device actuated by the electronic control device via an electrical signal.

10. The brake system according to claim 1, wherein the second brake signal provides for increasing brake pressure.

11. The brake system according to claim 1, wherein the valve device includes a two-way valve.

* * * * *